United States Patent
Kim et al.

(10) Patent No.: US 10,911,687 B2
(45) Date of Patent: Feb. 2, 2021

(54) ELECTRONIC DEVICE AND METHOD FOR CONTROLLING DISPLAY OF IMAGES

(71) Applicant: Samsung Electronics Co., Ltd., Gyeonggi-do (KR)

(72) Inventors: Byoungwoo Kim, Gyeonggi-do (KR); Hyoungseok Ko, Gyeonggi-do (KR); Sol Namkung, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/238,670

(22) Filed: Jan. 3, 2019

(65) Prior Publication Data

US 2019/0253633 A1 Aug. 15, 2019

(30) Foreign Application Priority Data

Feb. 14, 2018 (KR) .................. 10-2018-0018700

(51) Int. Cl.
*H04N 5/225* (2006.01)
*H04N 5/232* (2006.01)

(52) U.S. Cl.
CPC ..... *H04N 5/23296* (2013.01); *H04N 5/23232* (2013.01)

(58) Field of Classification Search
CPC .................................................. H04N 5/3692
See application file for complete search history.

(56) References Cited

U.S. PATENT DOCUMENTS

2003/0227556 A1* 12/2003 Doyle ................... G06F 3/0481
  348/239
2006/0175549 A1* 8/2006 Miller .............. G08B 13/19643
  250/334

(Continued)

FOREIGN PATENT DOCUMENTS

| EP | 3 136 707 A1 | 3/2017 | |
|---|---|---|---|
| KR | 10-2017-0060414 A | 6/2017 | |
| WO | WO-2017159027 A1 * | 9/2017 | ........... H04N 5/2628 |

OTHER PUBLICATIONS

International Search Report dated Apr. 4, 2019.

*Primary Examiner* — Twyler L Haskins
*Assistant Examiner* — Dwight Alex C Tejano
(74) *Attorney, Agent, or Firm* — Cha & Reiter, LLC.

(57) ABSTRACT

Certain embodiments of the disclosure relate to electronic devices and methods for controlling the display of images each obtained by a respective one of cameras. To that end, an electronic device comprises a first camera having a first view angle, a second camera having a second view angle smaller than the first view angle, a display, and a processor configured to obtain a first image corresponding to an external object using the first camera and a second image corresponding to the external object using the second camera, control the display to display the first image, in response to a request to adjust a magnification of the displayed first image, when the magnification meets a designated first condition, control the display to display a first synthesized image obtained by synthesizing at least a portion of the first image with the second image resized to correspond to at least the portion of the first image, and when the magnification meets a designated second condition, control the display to display a second synthesized image obtained by synthesizing at least a portion of the second image with at (Continued)

least the portion of the first image. Other certain embodiments are also possible.

19 Claims, 12 Drawing Sheets

(56) References Cited

U.S. PATENT DOCUMENTS

| 2007/0146503 | A1 | 6/2007 | Shiraki | |
|---|---|---|---|---|
| 2008/0030592 | A1 | 2/2008 | Border et al. | |
| 2008/0218611 | A1* | 9/2008 | Parulski | H04N 5/2258 348/262 |
| 2010/0238327 | A1* | 9/2010 | Griffith | H04N 5/2251 348/240.99 |
| 2012/0026366 | A1 | 2/2012 | Golan et al. | |
| 2012/0074227 | A1* | 3/2012 | Ferren | G06F 3/0237 235/462.21 |
| 2012/0075489 | A1* | 3/2012 | Nishihara | H04N 5/23296 348/222.1 |
| 2012/0092525 | A1 | 4/2012 | Kusaka | |
| 2013/0242141 | A1* | 9/2013 | Ohki | G06T 3/40 348/239 |
| 2015/0085174 | A1* | 3/2015 | Shabtay | H04N 5/23296 348/336 |
| 2016/0050351 | A1* | 2/2016 | Lee | H04N 5/23209 348/221.1 |
| 2016/0323516 | A1 | 11/2016 | Medasani et al. | |
| 2017/0150067 | A1 | 5/2017 | Han | |
| 2019/0098180 | A1* | 3/2019 | Tachi | H04N 5/04 |

* cited by examiner

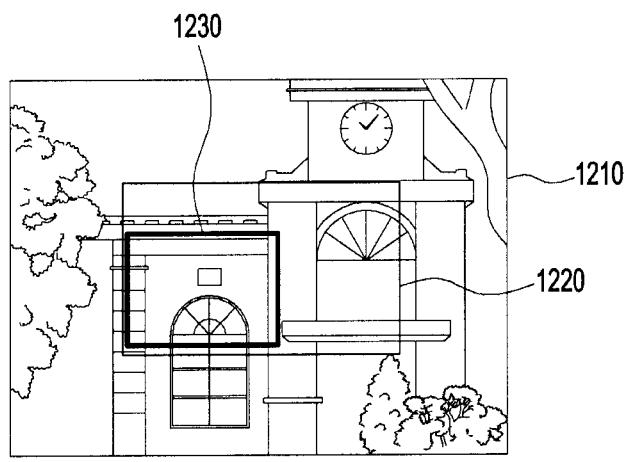
FIG.12A
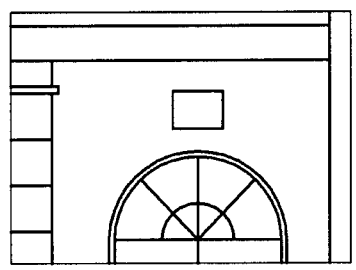 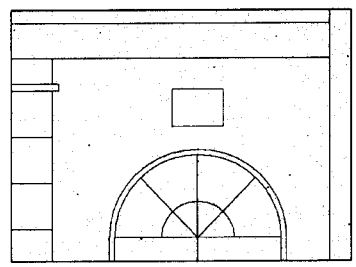
FIG.12B  FIG.12C

ELECTRONIC DEVICE AND METHOD FOR CONTROLLING DISPLAY OF IMAGES

CROSS-REFERENCE TO RELATED APPLICATION(S)

This application is based on and claims priority under 35 U.S.C. § 119 to Korean Patent Application No. 10-2018-0018700, filed on Feb. 14, 2018, in the Korean Intellectual Property Office, the disclosure of which is incorporated by reference herein in its entirety.

BACKGROUND

Field

Certain embodiments of the disclosure relate to electronic devices and methods for controlling the display of images obtained by a plurality of cameras.

Description of Related Art

Recently, electronic devices are providing more diversified services and additional functions. To meet users' various needs and raise use efficiency of electronic devices, communication service carriers or device manufacturers are jumping into competitions to develop services with differentiated and diversified features.

The above information is presented as background information only to assist with an understanding of the disclosure. No determination has been made, and no assertion is made, as to whether any of the above might be applicable as prior art with regard to the disclosure.

SUMMARY

An image obtained by an electronic device may be magnified by increasing the digital zoom ratio, and the resolution may be deteriorated in proportion to the zoom ratio. To address this issue, an electronic device could use dual cameras that simultaneously capture and store a first image at a first view angle (e.g., a wide angle) and a second image at a second view angle (e.g., a tele angle) and switch from the first image to the second image to magnify and play while playing the first image.

However, switching images may cause a shift in center or deterioration of image quality due to differences in point of view between the first view angle and the second view angle and differences in color tone between the first image and the second image.

According to an embodiment of the disclosure, an electronic device equipped with a plurality of cameras may obtain a first image with a first view angle using a first camera and a second image with a second view angle using a second camera and synthesize, and display, a portion of the second image with a portion of the first image as the magnification of the first image increases, with the first image displayed.

According to an embodiment of the disclosure, an electronic device, comprising a first camera having a first view angle, a second camera having a second view angle smaller than the first view angle, a display; and at least one processor configured to obtain a first image corresponding to an external object using the first camera and a second image corresponding to the external object using the second camera, control the display to display the first image, in response to a request to adjust a magnification of the displayed first image, when the magnification meets a designated first condition, control the display to display a first synthesized image wherein at least a portion of the first image is synthesized with the second image resized to correspond to the at least the portion of the first image, and when the magnification meets a designated second condition, control the display to display a second synthesized image wherein at least the portion of the second image is synthesized with at least the portion of the first image, resized to correspond to the at least the portion of the second image.

According to an embodiment of the disclosure, an electronic device, comprises a first camera having a first view angle, a second camera having a second view angle smaller than the first view angle, and at least one processor configured to obtain a first image corresponding to an external object using the first camera and a second image corresponding to the external object using the second camera, identify at least a portion of the first image corresponding to a view angle of the second image, obtain a first synthesized image by synthesizing at least the portion of the first image with the second image resized to correspond to at least the portion of the first image, obtain a second synthesized image by synthesizing at least the portion of the first image resized to correspond to at least a portion of the second image, and store the first synthesized image and the second synthesized image as part of images corresponding to the external object.

According to an embodiment of the disclosure, an electronic device, comprises a touchscreen display and at least one processor configured to control the touchscreen display to display a first image corresponding to an external object and obtained using a first camera with a first view angle in response to an image display request corresponding to the external object, in response to a request to adjust a magnification of the displayed first image, when the magnification meets a designated first condition, control the touchscreen display to display, on the touchscreen display, a first synthesized image, wherein at least a portion of the first image is synthesized with a second image resized to correspond to at least the portion of the first image based on a view angle of the second image corresponding to the external object, the second image being obtained using a second camera with a second view angle smaller than the first view angle, and when the magnification meets a designated second condition, control the touchscreen display to display a second synthesized image wherein at least a portion of the second image is synthesized with at least the portion of the first image resized to correspond to the second image.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein:

FIG. 12A is view illustrating an example of displaying an image on an electronic device according to an embodiment;

FIG. 12B is view illustrating an example of displaying an image on an electronic device according to an embodiment; and FIG. 12C is view illustrating an example of displaying an image on an electronic device according to an embodiment.

Throughout the drawings, like reference numerals will be understood to refer to like parts, components, and structures.

DETAILED DESCRIPTION

According to certain embodiments, an electronic device includes at least a first camera and a second camera. One embodiment of the electronic device will be described in FIG. 1. An embodiment of a camera, will be described in FIG. 2. FIG. 3 describes an embodiment of an electronic device with two or more cameras.

Electronic Device

Figure 1:
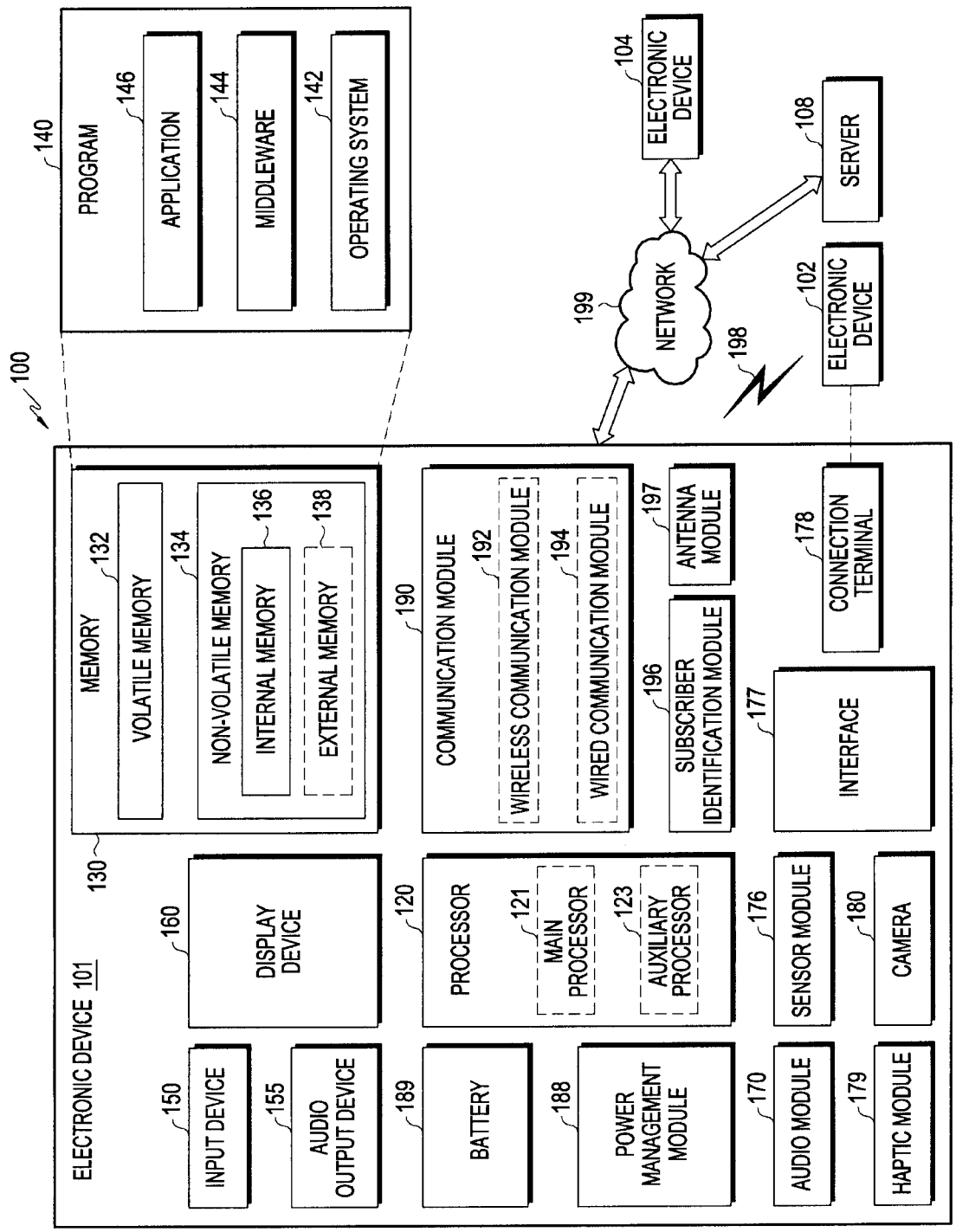
FIG. 1 is a block diagram illustrating an electronic device 101 in a network environment 100 according to certain embodiments.

FIG. 1 is a block diagram illustrating an electronic device 101 in a network environment 100 according to certain embodiments. Referring to FIG. 1, an electronic device 101 may communicate with an electronic device 102 via a first network 198 (e.g., short-range wireless communication) in a network environment 100, or may communicate with an electronic device 104 or a server 108 via a second network 199 (e.g., long-range wireless communication). According to one embodiment, the electronic device 101 may communicate with the electronic device 104 via the server 108. According to one embodiment, the electronic device 101 may include a processor 120, a memory 130, an input device 150, an audio output device 155, a display device 160, an audio module 170, a sensor module 176, an interface 177, a haptic module 179, two or more cameras 180 (although only one is shown), a power management module 188, a battery 189, a communication module 190, a subscriber identification module 196, and an antenna module 197. In some embodiments, as in the sensor module 176 (e.g., a fingerprint sensor, an iris sensor, or an illuminance sensor) embedded in the display device 160 (e.g., a display), some components may be integrated and implemented.

The processor 120 may drive, for example, software (e.g., a program 140) to control at least one other components (e.g., hardware or software components) of the electronic device 101 connected to the processor 120, and to perform various data processing and computations. The processor 120 may load and process commands or data received from the other components (e.g., the sensor module 176 or the communication module 190) into a volatile memory 132, and may store the resulting data in a non-volatile memory 134. According to one embodiment, the processor 120 may include a main processor 121 (e.g., central processing device or application processor) and an auxiliary processor 123 (e.g., graphic processing device, image signal processor, sensor hub processor, or communication processor) which is operated independently of the main processor, and which additionally or alternatively uses lower power than that of the main processor 121 or is specialized in a designated function. Here, the auxiliary processor 120 may be separately operated from the main processor 121 or may be embedded therein.

In this case, the auxiliary processor 123 may control at least some of functions or states related to at least one (e.g., the display device 160, the sensor module 176, or the communication module 190) of the components of the electronic device 101, in place of the main processor 121, for example, while the main processor 121 is in an inactive (sleep) state or together with the main processor 121 while the main processor 121 is in an active (application execution) state. According to one embodiment, the auxiliary processor 123 (e.g., image signaling processor or communication processor) may be implemented as some components of functionally related other components (e.g., the camera 180 or the communication module 190). The memory 130 may store various pieces of data used by at least one component (e.g., the processor 120 or the sensor module 176) of the electronic device 101, for example, software (e.g., the program 140) and input data or output data for a command related to the software. The memory 130 may include the volatile memory 132 or the non-volatile memory 134.

The program 140 may be software stored in the memory 130 and may include, for example, an operating system 142, middleware 144, or an application 146.

The input device 150 may be a device for receiving commands or data to be used for the components (e.g., processor 120) of the electronic device 101 from the outside (e.g., a user) of the electronic device 101, and may include, for example, a microphone, a mouse, or a keyboard.

The audio output device 155 may be a device for outputting a sound signal to the outside of the electronic device 101, and may include, for example, a speaker used for general use such as multimedia reproduction or recording reproduction and a receiver used only for telephone reception. According to one embodiment, the receiver may be formed integrally with or separately from the speaker.

The display device 160 may be a device for visually providing information to a user of the electronic device 101, and may include, for example, a display, a hologram device, or a projector, and a control circuit for controlling the corresponding device. According to one embodiment, the display device 160 may include a touch circuitry or a pressure sensor capable of measuring the intensity of the pressure with respect to a touch.

The audio module 170 may bidirectionally convert sound and electrical signals. According to one embodiment, the audio module 170 may acquire sound through the input device 150, or may output sound through the audio output device 155 or an external electronic device (e.g., the electronic device 102 {e.g., speaker or headphone}) which is wiredly or wirelessly connected to the electronic device 101.

The sensor module 176 may generate an electrical signal or data value corresponding to an internal operating state (e.g., power or temperature) of the electronic device 101 or an external environmental condition. The sensor module 176 may include, for example, a gesture sensor, a gyro sensor, a barometric sensor, a magnetic sensor, an acceleration sensor, a grip sensor, a proximity sensor, a color sensor, an infrared (IR) sensor, a biosensor, a temperature sensor, a humidity sensor, or an illuminance sensor.

The interface 177 may support a designated protocol that can be wiredly or wirelessly connected to an external electronic device (e.g., the electronic device 102). According to one embodiment, the interface 177 may include a high definition multimedia interface (HDMI), a universal serial bus (USB) interface, an SD card interface, or an audio interface.

The connection terminal 178 may include a connector that can physically connect the electronic device 101 and an external electronic device (e.g., the electronic device 102), such as an HDMI connector, a USB connector, an SD card connector, or an audio connector (e.g., a headphone connector).

The haptic module 179 may convert electrical signals into mechanical stimuli (e.g., vibrations or movements) or electrical stimuli that can be perceived by a user through tactile or kinesthetic sensations. The haptic module 179 may include, for example, a motor, a piezoelectric element, or an electrical stimulation device.

The camera 180 may capture a still image and a moving image. According to one embodiment, the camera 180 may include one or more lenses, an image sensor, an image signal processor, or a flash.

The power management module 188 may be a module for managing power supplied to the electronic device 101, and may be configured as at least a portion of, for example, a power management integrated circuit (PMIC).

The battery 189 may be a device for supplying power to at least one component of the electronic device 101, and may include, for example, a non-rechargeable primary battery, a rechargeable secondary battery, or a fuel cell.

The communication module 190 may support establishment of a wired or wireless communication channel between the electronic device 101 and an external electronic device (e.g., the electronic device 102, the electronic device 104, or the server 108) and may support communication execution through the established communication channel. The communication module 190 may include one or more communication processors that are operated independently of the processor 120 (e.g., application processor) and support wired communication or wireless communication. According to one embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN)) communication module, and may communicate with an external electronic device using the corresponding communication module among the above-described communication modules, through a first network 198 (e.g., a short-range communication network such as Bluetooth, Wi-Fi, direct or infrared data association {IrDA}) or a second network 199 (e.g., a long-range communication network such as a cellular network, the internet, or a computer network {e.g., LAN or WAN}). The various types of communication modules 190 described above may be implemented as a single chip or may be implemented as separate chips.

According to one embodiment, the wireless communication module 192 may use user information stored in the subscriber identification module 196 to identify or authenticate the electronic device 101 within a communication network.

The antenna module 197 may include one or more antennas for transmitting or receiving signals or power to or from the outside. According to one embodiment, the communication module 190 (e.g., the wireless communication module 192) may transmit or receive signals to or from the outside electronic device via an antenna suitable for the corresponding communication scheme.

Some of the above-described components may be connected to each other via a communication scheme (e.g., bus, general purpose input/output (GPIO), serial peripheral interface (SPI), or mobile industry processor interface (MIPI)) between peripheral devices, and may exchange signals (e.g., commands or data) with each other.

According to one embodiment, the commands or data may be transmitted or received between the electronic device 101 and the external electronic device 104 via the server 108 connected to the second network 199. Each of the electronic devices 102 may be a device may be the same or a different kind of device as or from the electronic device 101. According to one embodiment, all or some of operations executed in the electronic device 101 may be executed in another electronic device or a plurality of other electronic devices. According to one embodiment, when the electronic device 101 is required to perform any function or service automatically or by a request, the electronic device 101 may request at least partial function associated with the function or the service from other devices additionally or in place of executing the function or the service by itself. The external electronic device having received the request may execute the requested function or additional function, and may transmit the execution result to the electronic device 101.

The electronic device 101 may process the received result as is or additionally, and may provide the requested function or service. For this, for example, a cloud computing technology, a distributed computing technology, or a client-server computing technology may be used.

Camera

Figure 2:
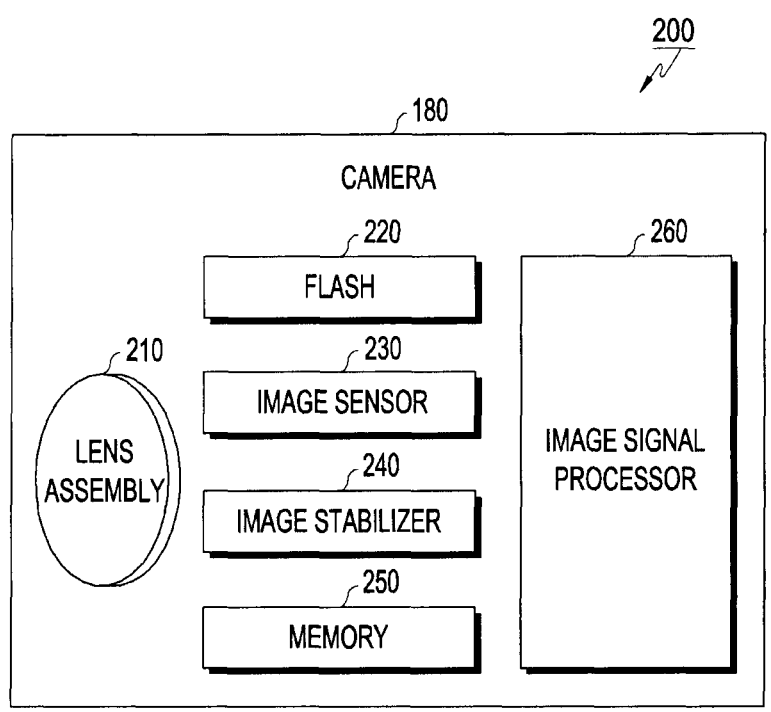
FIG. 2 is a block diagram 200 illustrating a camera 180 according to an embodiment.
Figure 3:
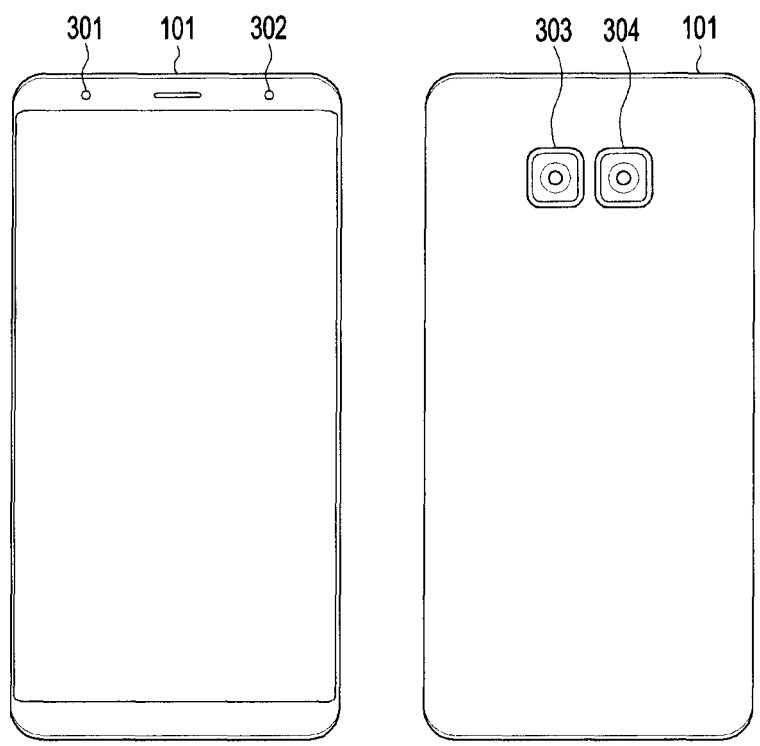
FIG. 3 is a perspective view illustrating the front or rear surface of an electronic device according to an embodiment.

FIG. 2 is a block diagram 200 illustrating a camera 180 according to an embodiment. As noted above, certain embodiments may include two or more cameras 180.

Referring to FIG. 2, the camera 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. The lens assembly 210 may include, for example, a wide-angle lens or a telephoto lens. The flash 220 may emit light that is used to reinforce light from an object. The flash 220 may include one or more light emitting diodes (LEDs) (e.g., a red-green-blue (RGB) LED, a white LED, an infrared (IR) LED, or an ultraviolet (UV) LED) or a xenon lamp.

The image sensor 230 may obtain an image corresponding to an object by converting light transmitted from the object via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor in the image sensor 230 may be implemented as, e.g., a charge-coupled device (CCD) sensor or a complementary metal-oxide-semiconductor (CMOS) sensor.

The foregoing generate an image composed of pixels. Depending on the lens angle, each pixel can represent a portion of light emitted by an external object. Depending on the angle of the lens, a pixel can represent a smaller portion of the external object (zoomed in) or a larger portion of the external object (zoomed out). For purposes of this document, a picture that is captured that is zoomed in is considered to have a higher magnification, while a picture that is zoomed out is considered to have a lower magnification.

The image stabilizer 240 may move in a particular direction, or control (e.g., adjust the read-out timing of), the image sensor 230 or at least one lens included in the lens assembly 210 to at least partially compensate for a negative effect (e.g., image blurring) on a captured image, which is caused by the motion of the camera 180 or the electronic device 101 including the camera 280, in response to the motion. According to an embodiment, the image stabilizer 240 may be implemented as, e.g., an optical image stabilizer. The image stabilizer 240 may sense such motion using a gyro sensor (not shown) or an acceleration sensor (not shown) disposed inside or outside the camera 180.

The memory 250 may store, at least temporarily, at least part of an image obtained via the image sensor 230 for a subsequent image processing task. For example, when image capturing is delayed due to shutter lag or multiple images are quickly captured, a raw image obtained (e.g., a high-resolution image) may be stored in the memory 250, and its corresponding copy (e.g., a low-resolution image) may be previewed through the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform image processing (e.g., depth map generation, three-dimensional (3D) modeling, panorama generation, feature point extraction, image mixing, or image compensation (e.g., noise canceling, resolution adjustment, brightness adjustment, blurring, sharpening, or softening)) on an image obtained through the image sensor 230 or an image stored in the memory 250. Additionally or alternatively, the image signal processor 260 may perform control (e.g., exposure time control or read-out timing control) with respect to at least one (e.g., the image sensor 230) of the components included in the camera 180. An image processed by the image signal processor 260 may be stored back in the memory 250 for further processing, or may be transferred to an external component (e.g., the memory 130, the display device 160, the electronic device 102, the electronic device 104, or the server 108) outside the camera 180. According to an embodiment, the image signal processor 260 may be configured as at least part of the processor 120, or as a separate processor that is operated independently from the processor 120. When the image signal processor 260 is configured as a separate processor, images processed by the image signal processor 260 may be displayed through the display device 160 as they are or after further processed by the processor 120.

According to an embodiment, the electronic device 101 may include two or more cameras 180 with different attributes or functions. In this case, at least one of the cameras 180 may be, e.g., a wide-angle camera or a front camera while at least one other camera may be a telephoto camera or a rear camera.

The electronic device according to certain embodiments may be one of various types of electronic devices. The electronic devices may include at least one of, e.g., a portable communication device (e.g., a smartphone), a computer device, a portable multimedia device, a portable medical device, a camera, a wearable device, or a home appliance. According to an embodiment of the disclosure, the electronic device is not limited to the above-listed embodiments.

It should be appreciated that certain embodiments of the disclosure and the terms used therein are not intended to limit the techniques set forth herein to particular embodiments and that various changes, equivalents, and/or replacements therefor also fall within the scope of the disclosure. The same or similar reference denotations may be used to refer to the same or similar elements throughout the specification and the drawings. It is to be understood that the singular forms "a", "an" and "the" include plural references unless the context clearly dictates otherwise. As used herein, the term "A or B", "at least one of A and/or B", "A, B, or C" or "at least one of A, B, and/or C" may include all possible combinations of the enumerated items. As used herein, the terms "first" and "second" may modify various components regardless of importance and/or order and are used to distinguish a component from another without limiting the components. It will be understood that when an element (e.g., a first element) is referred to as being (operatively or communicatively) "coupled with/to" or "connected with/to" another element (e.g., a second element), it can be coupled or connected with/to the other element directly or via a third element.

As used herein, the term "module" includes a unit configured in hardware, hardware programmed with software and may interchangeably be used with other terms, e.g., "logic", "logic block", "part" or "circuit." A module may be a single integral part or a minimum unit or part for performing one or more functions. For example, the module may be configured of an application-specific integrated circuit (ASIC).

Certain embodiments as set forth herein may be implemented as software (e.g., the program 140) containing commands that are stored in a machine (e.g., computer)-readable storage medium (e.g., an internal memory 136) or an external memory 138. The machine may be a device that may invoke a command stored in the storage medium and may be operated as per the invoked command. The machine may include an electronic device (e.g., the electronic device 101) according to embodiments disclosed herein. When the command is executed by a processor (e.g., the processor 120), the processor may perform a function corresponding to the command on its own or using other components under the control of the processor. The command may contain a code that is generated or executed by a compiler or an interpreter. The machine-readable storage medium may be provided in the form of a non-transitory storage medium. Here, the term "non-transitory" simply means that the storage medium does not include a signal and is tangible, but this term does not differentiate between where data is semipermanently stored in the storage medium and where data is temporarily stored in the storage medium.

According to an embodiment, a method according to certain embodiments of the disclosure may be included and provided in a computer program product. The computer program products may be traded as commodities between sellers and buyers. The computer program product may be distributed in the form of a machine-readable storage medium (e.g., a compact disc read only memory (CD-ROM)) or online through an application store (e.g., Playstore™). When distributed online, at least part of the computer program product may be temporarily generated or at least temporarily stored in a storage medium, such as the manufacturer's server, a server of the application store, or a relay server.

According to certain embodiments, each component (e.g., a module or program) may be configured of a single or multiple entities, and the certain embodiments may exclude some of the above-described sub components or add other sub components. Alternatively or additionally, some components (e.g., modules or programs) may be integrated into a single entity that may then perform the respective (pre-integration) functions of the components in the same or similar manner. According to certain embodiments, operations performed by modules, programs, or other components may be carried out sequentially, in parallel, repeatedly, or heuristically, or at least some operations may be executed in a different order or omitted, or other operations may be added.

According to an embodiment, an electronic device 101 comprises a first camera 301, 303 having a first view angle, a second camera 302, 304 having a second view angle smaller than the first view angle, a display (e.g., the display device 160), and at least one processor 120 (for purposes of this document, "processor" shall be understood to mean one or more processors) configured to obtain a first image corresponding to an external object using the first camera and a second image corresponding to the external object using the second camera, control the display to display the first image in response to a request to adjust a magnification of the displayed first image, when the magnification meets a designated first condition, control the display to display a first synthesized image wherein at least a portion of the first image is synthesized with the second image resized to correspond to at least the portion of the first image, and when the magnification meets a designated second condition, control the display to display a sized image wherein at least a portion of the second image is synthesized with at least the portion of the first image resized to correspond to at least the portion of the second image.

According to an embodiment, the processor 120 may be configured to synthesize at least the portion of the first image corresponding to a view angle of the second image with the second image resized to correspond to at least the portion of the first image.

According to an embodiment, the processor 120 may be configured to produce the first synthesized image by magnifying the first image and shrinking the second image to match at least a portion of the external object in the obtained first image with at least a portion of the external object in the obtained second image.

According to an embodiment, the processor 120 may be configured to produce the second synthesized image by magnifying the first image to match at least a portion of the external object in the obtained first image with at least a portion of the external object in the obtained second image.

According to an embodiment, the processor 120 may be configured to magnify and control the display to display the displayed first synthesized image or the displayed second synthesized image to correspond to the magnification.

According to an embodiment, the designated first condition may be that the first image displayed based on the adjustment of the magnification is smaller in magnification than the second image.

According to an embodiment, the designated second condition may be that the first image displayed based on the adjustment of the magnification is not smaller in magnification than the second image.

According to an embodiment, the displayed first synthesized image may be a synthesized image of at least the portion of the obtained first image and the obtained second image.

According to an embodiment, the displayed second synthesized image may be the obtained second image.

According to an embodiment, the electronic device 101 may further comprise a memory configured to store at least one of the obtained first image or the obtained second image, wherein the processor 120 may be configured to, upon receiving an input to magnify the first image, with the first image displayed on the display, identify whether the second image is present in the first synthesized image.

According to an embodiment, the processor 120 may be configured to control the display to display the second image based on the input to magnify when the second image is present in the first synthesized image.

According to an embodiment, the processor 120 may be configured to control the display to display the first image based on the input to magnify unless the second image is present in the first synthesized image.

According to an embodiment, an electronic device 101 comprises a first camera 1210 having a first view angle, a second camera 1220 having a second view angle smaller than the first view angle, and a processor 120 configured to obtain a first image corresponding to an external object using the first camera and obtain a second image corresponding to the external object using the second camera, identify at least a portion of the first image corresponding to a view angle of the second image, obtain a first synthesized image by synthesizing at least the portion of the first image with the second image resized to correspond to at least the portion of the first image, obtain a second synthesized image by synthesizing at least the portion of the first image with at least a portion of the second image, and store the first synthesized image and the second synthesized image as part of images corresponding to the external object.

According to an embodiment, the processor 120 may be configured to obtain the first synthesized image by magnifying the first image and shrinking the second image to match at least a portion of the external object in the obtained first image with at least a portion of the external object in the obtained second image.

According to an embodiment, the processor 120 may be configured to obtain the second synthesized image by magnifying the first image to match at least a portion of the external object in the obtained first image with at least a portion of the external object in the obtained second image.

According to an embodiment, the first synthesized image may be a synthesized image of at least the portion of the obtained first image and the obtained second image.

According to an embodiment, the second synthesized image may be the obtained second image.

According to an embodiment, the processor 120 may be configured to, upon receiving an input to magnify the first image, with the first image displayed on a display of the electronic device, identify whether the second image is present in a magnified area of the first image displayed corresponding to the input.

According to an embodiment, an electronic device 101 comprises a touchscreen display (e.g., the display device 160) and a processor 120 configured to control the touchscreen display to display, on the touchscreen display, a first image corresponding to an external object and obtained using a first camera with a first view angle in response to an image display request corresponding to the external object, in response to a request to adjust a magnification of the displayed first image, when the magnification meets a designated first condition, control the touchscreen display to display a first synthesized image, the first synthesized image obtained by synthesizing at least a portion of the first image with a second image resized to correspond to at least the portion of the first image based on a view angle of the second image corresponding to the external object and obtained using a second camera with a second view angle smaller than the first view angle, and when the magnification meets a designated second condition, control the touchscreen display to display, a second synthesized image obtained by synthesizing at least a portion of the second image with at least the portion of the first image.

As will be seen in FIG. 3, an electronic device can have two or more cameras, which can be used together to provide better zoom capabilities. A picture by one camera can be displayed on display 160. However, a user can request to digitally zoom the picture. This can result in deterioration of the image quality. Accordingly, in certain embodiments, cameras having different magnifications (lens angles) can simultaneously (contemporaneously, or overlappingly, or in quick succession) can take a picture of the same external object. As the user requests different magnifications, a synthesized picture generated from the pictures produced by each camera can be displayed. For example, if a magnification is requested that is closer to the magnification of one camera, portions of the picture produced by the camera can be combined with resized portions of the other camera. If the magnification requested is closer to the other camera, then vice versa.

FIG. 3 is a perspective view illustrating the front or rear surface of an electronic device according to an embodiment.

According to an embodiment, an electronic device 101 may include a plurality of cameras exposed to the outside through a housing. The electronic device 101 may have the plurality of cameras to be exposed through its front or rear surface. According to an embodiment, the electronic device 101 may have a first camera 301 and a second camera 302 on its front surface or a third camera 303 and a fourth camera 304 on its rear surface. The first camera 301 and the second camera 302 respectively may obtain images with different view angles. The third camera 303 and the fourth camera 304 respectively may obtain images with different view angles.

The electronic device 101 may have the first camera 301 and the second camera 302 on its front surface and the third camera 303 and the fourth camera 304 on its rear surface. According to an embodiment, the first camera 301 may obtain an image with a first view angle (e.g., a wide angle), and the second camera 302 may obtain an image with a second view angle (e.g., a tele angle). The first camera 301 may obtain an image with the second view angle (e.g., a tele angle), and the second camera 302 may obtain an image with the first view angle (e.g., a wide angle).

The third camera 303 may obtain an image with a wide angle, and the fourth camera 304 may obtain an image with a tele angle. The third camera 303 may obtain an image with a tele angle, and the fourth camera 304 may obtain an image with a wide angle. At least one of the first camera 301, the second camera 302, the third camera 303, or the fourth camera 304 may include at least one of an array camera, a stereo camera, a time-of-flight (TOF) sensor, a structure light sensor, and an infrared (IR) sensor. The array camera may include a plurality of cameras. The first to fourth cameras 301, 302, 303, and 304 may transfer images obtained by capturing an external object to the image signal processor 260 or the processor 120. The first to fourth cameras 301, 302, 303, and 304 may gather images with a plurality of color pixels and transfer the images to the image signal processor 260 or the processor 120. At least one of the first to fourth cameras 301, 302, 303, and 304 may include at least one image (or video) sensor 230 connected with the electronic device 101. The first to fourth cameras 301, 302, 303, and 304 may include a depth sensor. The depth sensor may include at least one sensor that is implemented as an infrared pulse laser operated in a time-of-flight (TOF) scheme to output depth information about the external object.

The first camera 301 provided on the front surface of the electronic device 101 may at least partially share the view angle with the second camera 302, or the second camera 302 may at least partially share the view angle with the first camera 301. Likewise, the third camera 303 provided on the rear surface of the electronic device 101 may at least partially share the view angle with the fourth camera 304, or the fourth camera 304 may at least partially share the view angle with the third camera 303. For example, the second camera 320 may have a smaller view angle than the first camera 301, or the fourth camera 304 may have a view angle smaller than the third camera 303. At least one of the first to fourth cameras 301, 302, 303, and 304 may include a TOF-based sensor that determines depth information based on the time taken for an IR pulse laser beam emitted to be received back after reflected on an object. At least one of the first camera 301 or the second camera 302 may be placed anywhere on the same surface of the electronic device 101, and at least one of the third camera 303 or the fourth camera 304 may be placed anywhere on the same surface of the electronic device 101.

FIG. 4A-4D is a view illustrating an example of displaying images obtained by a plurality of cameras of an electronic device according to an embodiment. FIG. 5 is a flowchart illustrating the operation of displaying images on an electronic device according to an embodiment.

The operation of displaying images on the electronic device is described below in detail with reference to FIGS. 3 to 5, according to certain embodiments.

Figure 4A:
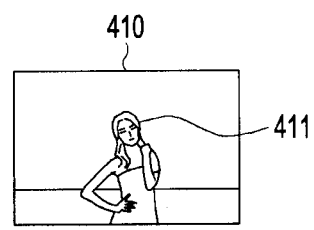
FIG. 4A is a view illustrating an example of displaying images obtained by a plurality of cameras provided in an electronic device according to an embodiment.
Figure 5:
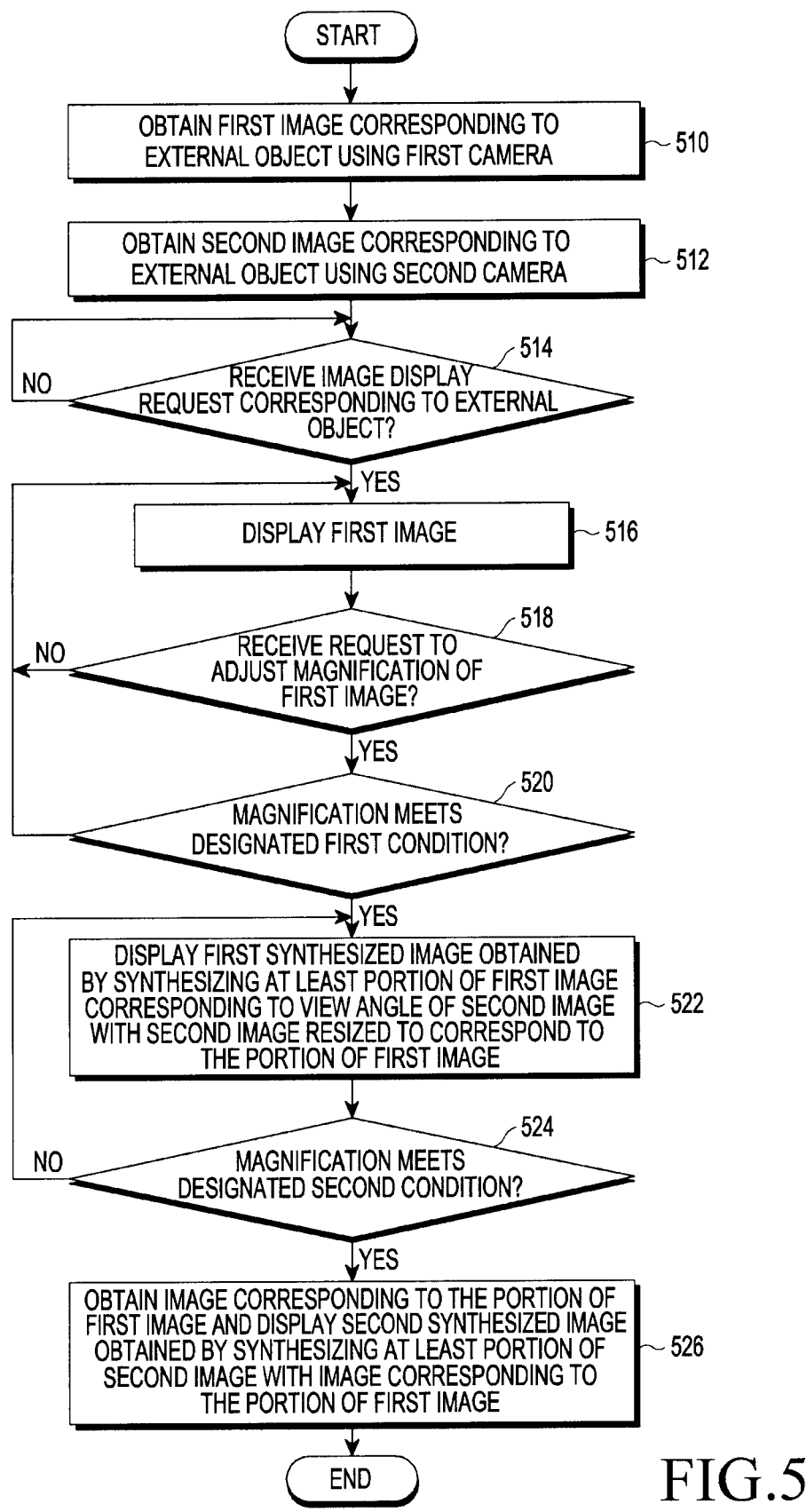
FIG. 5 is a flowchart illustrating the operation of displaying an image on an electronic device according to an embodiment.

In operation 510, the electronic device 101 (e.g., the processor 120) may obtain a first image 410 corresponding to an external object 411 shown in FIG. 4A using a first camera 301 or 303. The first camera 301 or 303 may be one of a plurality of cameras provided to be exposed to the outside through the housing of the electronic device 101. Each of the plurality of cameras provided in the electronic device 101 may include a respective one of lenses with different view angles. The plurality of cameras provided in the electronic device 101 may simultaneously capture an external object to obtain their respective corresponding images. According to an embodiment, the electronic device 101 may have a first camera 301 or 303 with a first view angle and a second camera 302 or 304 with a second view angle, which differs from the first view angle, on one surface of its housing. The electronic device 101 may obtain a first image 410 corresponding to the external object 411 using the first camera 301 or 303 with the first view angle.

Figure 4B:
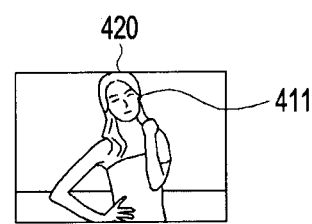
FIG. 4B is a view illustrating an example of displaying images obtained by a plurality of cameras provided in an electronic device according to an embodiment.

In operation 512, the electronic device 101 (e.g., the processor 120) may obtain a second image 420 corresponding to an external object 411 shown in FIG. 4B using the second camera 302 or 304. The electronic device 101 may obtain a second image 420 corresponding to the external object 411 using the second camera 302 or 304 with the second view angle. The first image 410 and the second image 420 may simultaneously be obtained by one capturing input. For example, where the first image 410 has the first view angle (e.g., a wide angle), and the second image 420 has the second view angle (e.g., a tele angle) smaller than the first view angle, the external object 411 in the first image 410 may be smaller in size than the external object 411 in the second image 420.

In operation 514, the electronic device 101 (e.g., the processor 120) may receive an image display request corresponding to the external object 411. The electronic device 101 may receive a request to display at least one of the first image 410 or second image 420 obtained. According to an embodiment, the electronic device 101 may receive a request to display at least one of the first image 410 with the first view angle through the first camera 301 or 303 the second image 420 with the second view angle through the second camera 302 or 304.

According to an embodiment, the electronic device 101 may receive a request to display images previously captured of the same object using the first camera 301 or 303 and the second camera 302 or 304 with a view angle different from a view angle of the first camera and stored in the memory 130

In operation 516, the electronic device 101 (e.g., the processor 120) may display the first image 410. The electronic device 101 may display the obtained first image 410 on the display device 160 (e.g., a touchscreen display) in response to the request to display the obtained first image 410. The electronic device 101 may display at least one of the first image 410 or the second image 420 on the display device 160 (e.g., a touchscreen display) in response to the reception of the request to display at least one of the first image 410 with the first view angle through the first camera 301 or 303 or the second image 420 with the second view angle through the second camera 302 or 304.

In operation 518, the electronic device 101 (e.g., the processor 120) may receive a request to adjust the magnification of the first image 410. According to an embodiment, the electronic device 101 may receive a request to adjust the magnification (such as a pinch-out gesture on a touchscreen display) of the displayed first image 410, with the first image 410 displayed on the display device 160. The electronic device 101 may receive a request to increase the magnification of the first image 410 displayed on the display device 160. According to an embodiment, the electronic device 101 may magnify and display the first image 410 in response to the request to magnify the first image 410. The electronic device 101 may magnify and display, in realtime, the first image 410 in response to the request to magnify the first image 410. According to an embodiment, the electronic device 101 may shrink and display the first image 410 in response to a request to decrease the magnification (such a pinching gesture on a touchscreen display) of the first image 410. The request may be received based on a touch input on the multiswipe-based display device 160 or the functionality of adjusting the size of the image provided on the electronic device 101.

In operation 520, the electronic device 101 (e.g., the processor 120) may determine whether the magnification meets a designated first condition. The electronic device 101 may determine whether the magnification of the magnified first image meets the designated first condition while magnifying and displaying the first image 410 based on the request to magnify the first image 410. According to an embodiment, the designated first condition may include the case where the magnification of the third image 430 is smaller than the magnification of the second image 420 based on the adjustment (e.g., increasing) of the magnification. According to an embodiment, the designated first condition may be determined to be met when the ratio of the area where the second image 420 is displayed to the entire area of the display device 160 is not less or larger than a predetermined value.

Figure 4C:
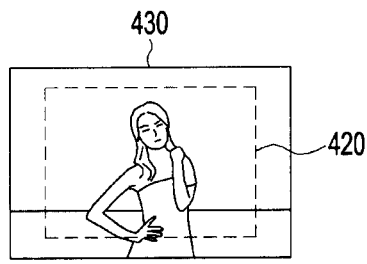
FIG. 4C is a view illustrating an example of displaying images obtained by a plurality of cameras provided in an electronic device according to an embodiment.
Figure 4D:
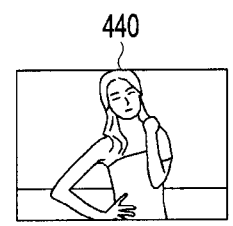
FIG. 4D is a view illustrating an example of displaying images obtained by a plurality of cameras provided in an electronic device according to an embodiment.

According to an embodiment, in operation 522, the electronic device 101 (e.g., the processor 120) may display a first synthesized image 430 (e.g., FIG. 4C) obtained by synthesizing at least a portion of the first image 410 corresponding to the view angle of the second image with the second image 420 resized to correspond to the at least a portion of the first image. Where the magnification of the first image 410 displayed on the display device 160 meets the designated first condition, the electronic device 101 may produce a first synthesized image 430 by synthesizing at least a portion of the first image 410 corresponding to the view angle of the second image 420 with the second image 420 resized to correspond to the at least a portion of the first image and display the generated first synthesized image 430 on the display device 160. Upon receiving a request to increase the magnification of the first image 430, the electronic device 101 may magnify the first image 410 and synthesize the second image 420. According to an embodiment, the electronic device 101 may match at least a portion of the external object 411 in the obtained first image with at least a portion of the external object 411 in the obtained second image, e.g., increase the magnification of the first image as shown in FIG. 4C, thereby producing the first synthesized image 430. According to an embodiment, the electronic device 101 may increase the magnification of the first image 410 to match at least a portion of the external object 411 in the obtained first image 410 with at least a portion of the external object 411 in the obtained second image 420, thereby producing the first synthesized image 430.

In certain embodiments, the first synthesized image can be formed by shrinking the second image to the desired magnification. Since the second image is shrunk, it will result in an empty border surrounding the shrunken second picture. The border surrounding the second picture can be replaced by expanding the first picture to the desired magnification, and using the pixels from the areas not captured by the second picture. A deblocking filter, and tone adjustment, can be used to prevent the appearance of a border between the portion of the synthesized picture that came from the second picture and the first picture. This improves the quality as compared to simply expanding the first picture because the second picture will have a greater amount of detail.

According to an embodiment, in operation 524, the electronic device 101 (e.g., the processor 120) may determine whether the magnification meets a designated second condition. The electronic device 101 (e.g., the processor 120) may determine whether the magnification meets the designated second condition. In response to the reception of a request to adjust magnification, the electronic device 101 may determine whether the magnification meets the designated second condition while displaying the first synthesized image 430. According to an embodiment, the designated second condition may include the case where the magnification of the displayed first synthesized image 430 is larger than the magnification of the second image 420 based on the adjustment (e.g., increasing) of the magnification. According to an embodiment, the designated second condition may be determined to be met when the second image 420 is displayed on the entire area of the display device 160.

According to an embodiment, in operation 526, the electronic device 101 (e.g., the processor 120) may display a second synthesized image obtained by synthesizing at least a portion of the second image 420 with at least the portion. The electronic device 101 may display the second synthesized image 440 (e.g., FIG. 4D) obtained by synthesizing at least a portion of the first image 410 with at least a portion of the second image. The electronic device 101 may display the second synthesized image 440 obtained by synthesizing at least a portion of the first image 410 corresponding to the view angle of the second image with the second image. According to an embodiment, where the magnification of the first synthesized image 430 displayed on the display device 160 meets the designated second condition, the electronic device 101 may display the second synthesized image 440 obtained by synthesizing at least a portion of the first image 410 corresponding to the view angle of the second image 420 with the second image 420. Where the magnification of the first image 410 meets the second condition, the electronic device 101 may synthesize the second image 420 with at least a portion of the first image 410. According to an embodiment, where the magnification of the first image 410 meets the second condition, the electronic device 101 may display the second synthesized image 440. According to an embodiment, the electronic device 101 may increase the magnification of the first image to match at least a portion of the external object in the obtained first image with at least a portion of the external object in the obtained second image, thereby producing the second synthesized image 440. The electronic device 101 may magnify the second synthesized image 440 corresponding to the magnification and display the magnified second synthesized image 440.

FIG. 6A-6E is a view illustrating an example of synthesizing a first image and a second image according to an embodiment. FIG. 7 is a flowchart illustrating the operation of synthesizing a first image and a second image according to an embodiment.

The operation of synthesizing images is described below in detail with reference to FIGS. 3, 6A-6E, and 7, according to an embodiment.

According to an embodiment, in operation 710, the electronic device 101 (e.g., the processor 120) may obtain a first image 610 corresponding to an external object using a first camera 301 or 303. The electronic device 101 may obtain a first image 610 corresponding to the external object 611 using the first camera 301 or 303 with the first view angle (e.g., a wide angle). The electronic device 101 may obtain the first image 610 corresponding to the external object 611 shown in FIG. 6A using the first camera 310 or 303 with the first view angle and display the first image 610 on the display device 160. For example, the electronic device 101 may obtain the first image 610 at a first magnification.

Figure 6A:
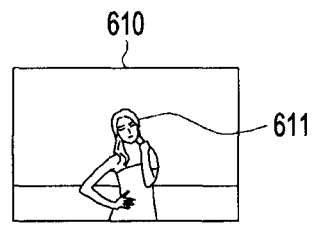
FIG. 6A is a view illustrating an example of synthesizing a first image and a second image according to an embodiment.
Figure 6B:
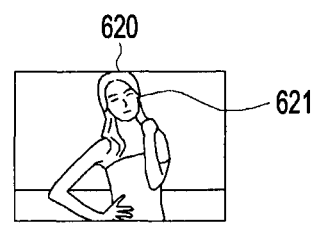
FIG. 6B is a view illustrating an example of synthesizing a first image and a second image according to an embodiment.
Figure 7:
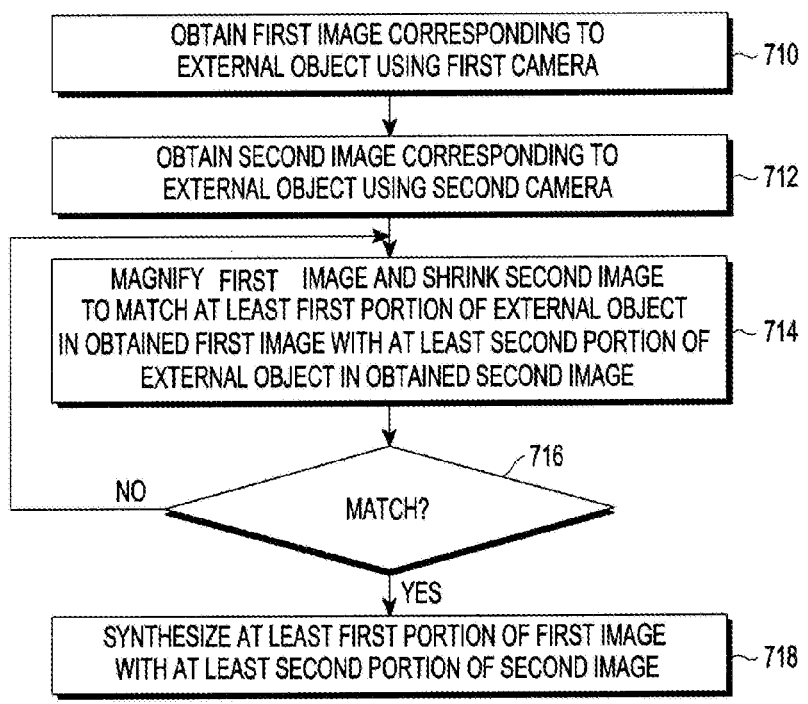
FIG. 7 is a flowchart illustrating the operation of synthesizing a first image and a second image according to an embodiment.

According to an embodiment, in operation 712, the electronic device 101 (e.g., the processor 120) may obtain a second image 620 corresponding to an external object 621 shown in FIG. 6B using the second camera 302 or 304. The second image 620 is zoomed in/has a greater magnitude/uses a tele angle as compared to the first image. Therefore, even if the second image has same pixel resolution, the second picture includes less of the external view, but with greater detail. The electronic device 101 may obtain the second image 620 corresponding to the external object 621 using the second camera 302 or 304 with the second view angle (e.g., a tele angle). The electronic device 101 may obtain the second image 620 corresponding to the external object 621 using the second camera 302 or 304 with the second view angle and display the second image 620 on the display device 160. The first image 610 and the second image 620 may simultaneously be obtained by one capturing input. According to an embodiment, where the first image 610 has the first view angle (e.g., a wide angle), and the second image 620 has the second view angle (e.g., a tele angle) smaller than the first view angle, the external object 611 in the first image 610 may be smaller in size than the external object 621 in the second image 620. For example, the electronic device 101 may obtain the first image 610 at the magnification according to the first view angle (e.g., a wide angle) through the first camera 301 or 303 and the second image 620 at the magnification according to the second view angle (e.g., a tele angle) through the second camera 302 or 304. Operations 710 and 712, respectively, may at least partially perform operations 510 and 512 of FIG. 5.

Figure 6C:
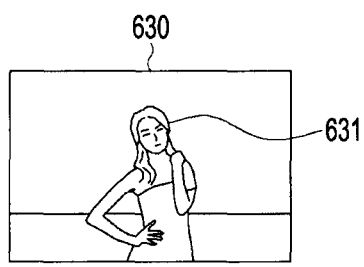
FIG. 6C is a view illustrating an example of synthesizing a first image and a second image according to an embodiment.
Figure 6D:
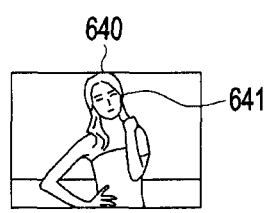
FIG. 6D is a view illustrating an example of synthesizing a first image and a second image according to an embodiment.
Figure 6E:
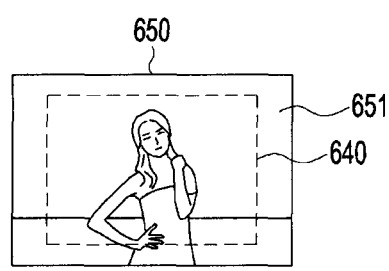
FIG. 6E is a view illustrating an example of synthesizing a first image and a second image according to an embodiment.

According to an embodiment, in operation 714, the electronic device 101 (e.g., the processor 120) may magnify the first image 610 to, e.g., the third image 630 shown in FIG. 6C, and shrink the second image 620 to, e.g., the fourth image 640 shown in FIG. 6D, to match at least a portion of the external object 611 in the first image 610 obtained through the first camera 301 or 303 with at least a portion of the external object 621 in the second image 620 obtained through the second camera 302 or 304. The electronic device 101 may determine the magnification to match (e.g., in size or color) the object 611 in the first image 610 with the object 621 in the second image 620 based on the magnification of the obtained first image 610 and the magnification of the obtained second image 620. For example, the electronic device 101 may magnify the first image 610 to, e.g., the third image 630, so that the first image 610 has the determined magnification and shrink the second image to, e.g., the fourth image 640 so that the second image 620 has the determined magnification. The electronic device 101 may magnify the first image 610 to, e.g., the third image 630 and shrink the second image 620 to, e.g., the fourth image 640 so that the object 611 in the obtained first image 610 is equal in size to the object 621 in the obtained second image 620. Where the first image 610 is magnified to the third image 630 based on the determined magnification, the resolution of the magnified first image 610, i.e., the third image 630, may be lower than the resolution of the prior first image 610. Where the second image 620 is shrunken to the fourth image 640 based on the determined magnification, the resolution of the shrunken second image 620, i.e., the fourth image 640, may be higher than the resolution of the prior second image 620.

According to an embodiment, in operation 716, the electronic device 101 (e.g., the processor 120) may determine whether at least a portion of the external object in the magnified first image 610, i.e., the third image 630, matches at least a portion of the object in the shrunken second image 620, i.e., the fourth image 640. The electronic device 101 may increase the size of the first image 610 to the size of the third image 630 so that the first image 610 has the determined magnification and decrease the size of the second image 620 to the size of the fourth image 640 so that the second image 620 has the determined magnification, determining whether at least a portion of the external object 631 in the third image 630 matches at least a portion of the external object 641 in the fourth image 640. The electronic device 101 may determine that the third image 630 matches the fourth image 640 when disparities in, e.g., color tone or noise between the external object 631 in the third image 630 and the external object 641 in the fourth image 640 are removed or minimized.

According to an embodiment, in operation 718, the electronic device 101 (e.g., the processor 120) may synthesize at least a portion of the fourth image 640 with at least a portion of the third image 630. Upon determining that at least a portion of the external object 631 in the third image 630 matches at least a portion of the object in the fourth image 640, the electronic device 101 may synthesize the portion of the third image 630 with the fourth image (or at least a portion of the fourth image) into a first synthesized image 650. In the first synthesized image 650, the resolution of the fourth image 640 is the same as the resolution of the second image 620. The resolution of the rest of the first synthesized image 650, except for the fourth image 640, is the same as the resolution of the first image 610. Since the second image 620 has greater detail, even when shrunken 640 than the first image 610, replacing the portion of the expanded first image with the shrunken second image results in a synthesized picture with greater detail.

FIG. 8A-8D is a view illustrating an example of synthesizing a first image and a second image according to an embodiment. FIG. 9 is a flowchart illustrating the operation of synthesizing a first image and a second image according to an embodiment.

The operation of synthesizing images is described below in detail with reference to FIGS. 3, 8A-8D, and 9, according to an embodiment.

According to an embodiment, in operation 910, the electronic device 101 (e.g., the processor 120) may obtain a first image 810 corresponding to an external object 811 (e.g., FIG. 8A) using the first camera 301 or 303. The electronic device 101 may obtain a first image 810 corresponding to the external object 811 using the first camera 301 or 303 with the first view angle (e.g., a wide angle). The electronic device 101 may obtain the first image 810 corresponding to the external object 811 using the first camera 301 or 303 with the first view angle and display the first image 610 on the display device 160. The electronic device 101 may obtain the first image 810 based on a first magnification.

According to an embodiment, in operation 912, the electronic device 101 (e.g., the processor 120) may obtain a second image 820 corresponding to the external object using a second camera 302 or 304. The electronic device 101 may obtain the second image 820 corresponding to the external object 821 (e.g., FIG. 8B) using the second camera 302 or 304 with the second view angle (e.g., a tele angle). Even if the second image 820 has the same pixel resolution as the first image 810, it covers less of the external scenery, but in greater detail. The electronic device 101 may obtain the second image 820 corresponding to the external object 821 using the second camera 302 or 304 with the second view angle and display the second image 620 on the display device 160. The first image 810 and the second image 820 may simultaneously be obtained by one capturing input. According to an embodiment, where the first image 810 has the first view angle (e.g., a wide angle), and the second image 820 has the second view angle (e.g., a tele angle) smaller than the first view angle, the external object 811 in the first image 810 may be smaller in size than the external object 821 in the second image 820. For example, the electronic device 101 may obtain the first image 810 at the magnification according to the first view angle (e.g., a wide angle) through the first camera 301 or 303 and the second image 820 at the magnification according to the second view angle (e.g., a tele angle) through the second camera 302 or 304. Operations 910 and 912, respectively, may at least partially perform operations 710 and 712 of FIG. 7.

Figure 8A:
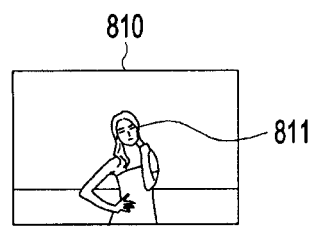
FIG. 8A is a view illustrating an example of synthesizing a first image and a second image according to an embodiment.
Figure 8B:
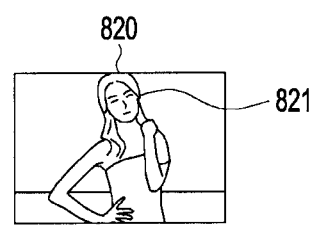
FIG. 8B is a view illustrating an example of synthesizing a first image and a second image according to an embodiment.
Figure 8C:
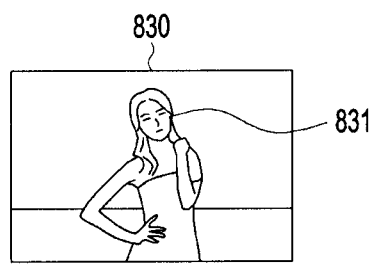
FIG. 8C is a view illustrating an example of synthesizing a first image and a second image according to an embodiment.
Figure 8D:
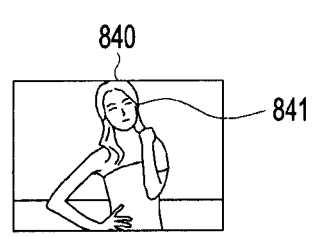
FIG. 8D is a view illustrating an example of synthesizing a first image and a second image according to an embodiment.
Figure 9:
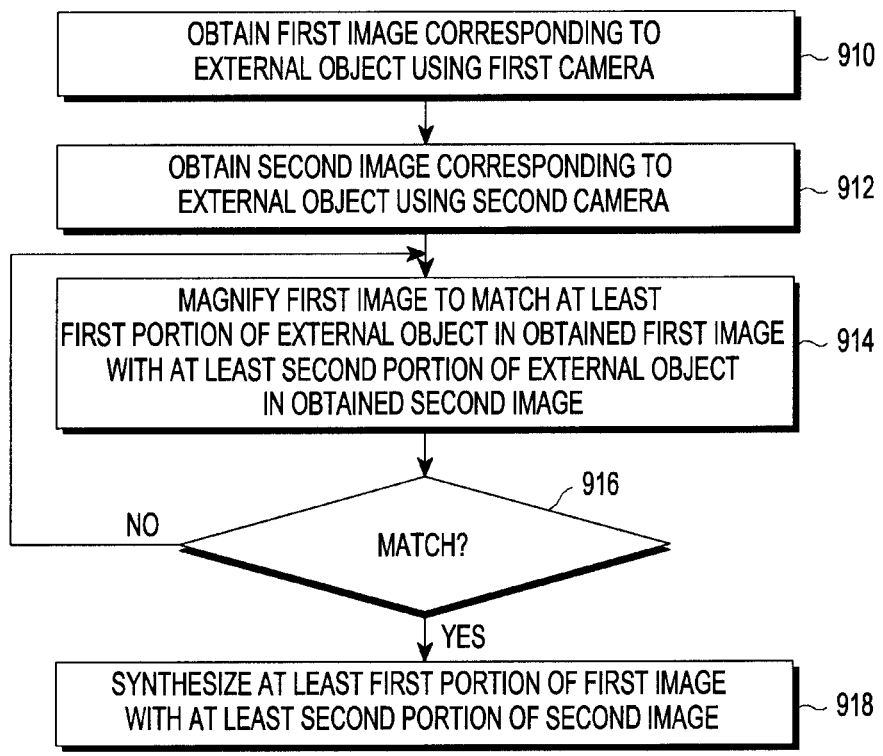
FIG. 9 is a flowchart illustrating the operation of synthesizing a first image and a second image according to an embodiment.

According to an embodiment, in operation 914, the electronic device 101 (e.g., the processor 120) may magnify the first image 810 to, e.g., the third image 830 shown in FIG. 8C to match at least a portion of the external object 811 in the obtained first image 810 with at least a portion of the external object 821 in the obtained second image 820. The electronic device 101 may magnify the first image 810 to, e.g., the third image 830 so that the first image 810 is equal in size to the second image 820. The electronic device 101 may magnify the first image 810 to, e.g., the third image 830 so that the first image 810 is equal in magnification to the second image 820. The electronic device 101 may magnify the first image 810 to, e.g., the third image 830 so that the external object 811 in the obtained first image 810 is equal in size to the external object 821 in the obtained second image 820. Where the magnification of the first image 810 is increased to the magnification of the second image 820, the resolution of the magnified first image 810, i.e., the third image 830, may be lower than the resolution of the prior first image 810.

According to an embodiment, in operation 916, the electronic device 101 (e.g., the processor 120) may determine whether at least a portion of the external object 831 in the magnified first image 810, i.e., the third image 830, matches at least a portion of the external object 821 in the obtained second image 820. The electronic device 101 may determine whether at least a portion of the external object 831 in the third image 830 matches at least a portion of the external object 821 in the obtained second image 820 by magnifying the first image 810 to the third image 830 so that the first image 810 is equal in size to the second image 820. The electronic device 101 may determine that the third image 830 matches the second image 820 when disparities in, e.g., color tone or noise between the external object 831 in the third image 830 and the external object 821 in the second image 820 is removed or minimized.

According to an embodiment, in operation 918, the electronic device 101 (e.g., the processor 120) may synthesize at least a portion of the second image 820 with at least a portion of the third image 830. Upon determining that at least a portion of the external object 831 in the third image 830 matches at least a portion of the external object 821 in the second image 820, the electronic device 101 may synthesize the portion of the third image 830 with the second image 820 into a second synthesized image 840 shown in FIG. 8D. The resolution of the second synthesized image 840 is the same as the resolution of the second image 820. According to an embodiment, the first synthesized image (e.g., 650 of FIG. 6E) may have the same point of view as the second synthesized image 840 since they adopt the same image transformation matrix except for different zoom ratios. In magnifying the first image 810 to the third image 830, the electronic device 101 may perform a color tone mapping operation on the first image 810 and the second image 820, allowing the second synthesized image 840 the same color tone free of a disparity in quality between the first image 810 and the second image 820. The mapping operation is intended to eliminate any disparity that may arise between the first image 810 and the second image 820 upon switching the first image 810 to the second image 820, and such operation may include matching the first image 810 with the second image 820 in light of color, noise, chrominance, or tone.

Figure 10:
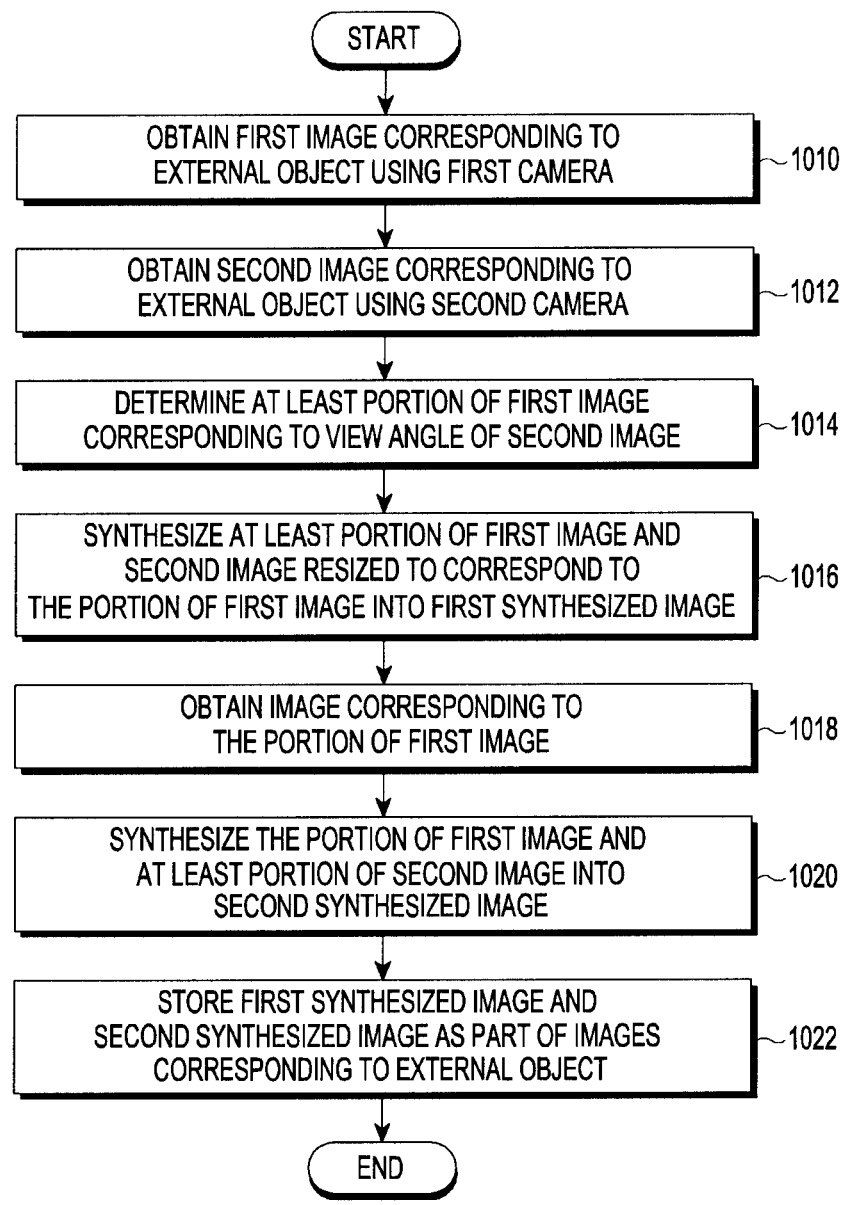
FIG. 10 is a flowchart illustrating the operation of capturing an image by an electronic device according to an embodiment.

FIG. 10 is a flowchart illustrating the operation of capturing an image by an electronic device according to an embodiment.

The operation of capturing images on an electronic device is described below in detail with reference to FIGS. 6, 8, and 10, according to an embodiment.

According to an embodiment, in operation 1010, the electronic device 101 (e.g., the processor 120) may obtain a first image 610 corresponding to an external object 611 using the first camera 301 or 303. According to an embodiment, in operation 1012, the electronic device 101 (e.g., the processor 120) may obtain a second image 620 corresponding to an external object 621 using the second camera 302 or 304. Operations 810 and 812, respectively, may at least partially perform operations 510 and 512 of FIG. 5 or operations 710 and 712 of FIG. 7.

According to an embodiment, in operation 1014, the electronic device 101 (e.g., the processor 120) may determine at least a portion of the first image 610 corresponding to the view angle of the second image 620. The electronic device 101 may determine what portion of the first image 610 the second image 620 corresponds to, based on the second image 620. According to an embodiment, the electronic device 101 may determine what portion of the first image 610 the second image 620 corresponds to based on property information (e.g., magnification, position of object, or color of object) about the second image 620. According to an embodiment, the electronic device 101 may magnify the first image 610 and determine at least a portion of the first image 610 corresponding to the view angle of the second image 620. According to an embodiment, when at least a portion of the first image 610 is determined corresponding to the view angle of the second image 620, the electronic device 101 may determine to synthesize the second image 620 with the first image 610.

According to an embodiment, in operation 1016, the electronic device 101 (e.g., the processor 120) may produce a first synthesized image 650 obtained by synthesizing at least a portion of the first image 610 with the second image 620 resized to correspond to at least the portion of the first image 610. The electronic device 101 may produce a first synthesized image 650 obtained by synthesizing at least a portion of the first image 610 corresponding to the view angle of the second image 620 with the second image 620 resized to correspond to at least the portion of the first image 610. When at least a portion of the first image 610 is determined corresponding to the view angle of the second image 620, the electronic device 101 may produce a first synthesized image 650 obtained by synthesizing at least a portion of the first image 610 corresponding to the view angle of the second image 620 with the second image 620 resized to correspond to at least the portion of the first image 610. When the first image 610 is obtained through the first camera 301 or 303, and the second image 620 is obtained through the second camera 302 or 304, the electronic device 101 may magnify the obtained first image and determine at least a portion of the first image corresponding to the view angle of the second image, synthesizing the second image 640 with at least the portion of the first image 651 into the first synthesized image 650 shown in FIG. 6E. According to an embodiment, the electronic device 101 may magnify the first image 610 and shrink the second image 620 to synthesize a portion of the external object 611 in the first image 610 with a portion of the external object 621 in the second image 620. According to an embodiment, the electronic device 101 may magnify the first image 610 to have the same magnification as the second image 620 so as to synthesize a portion of the object in the first image 610 with a portion of the object in the second image 620. In the first synthesized image, the portion 640 has the same resolution as the second image, and the rest of the first synthesized image, except for the portion 640, has the same resolution as the first image 610.

According to an embodiment, in operation 1018, the electronic device 101 (e.g., the processor 120) may obtain an image corresponding to at least the portion. The electronic device 101 may obtain the image corresponding to at least the portion by synthesizing the second image 620 with at least a portion of the first image 610 corresponding to the view angle of the second image 620. The electronic device 101 may obtain the image corresponding to at least the portion to synthesize the second image 620 with at least a portion of the first image 610 corresponding to the view angle of the second image 620 and display on the display device 160.

According to an embodiment, in operation 1020, the electronic device 101 (e.g., the processor 120) may synthesize at least a portion of the second image with the image corresponding to at least the portion into a second synthesized image 840. The electronic device 101 may synthesize at least a portion of the second image 620 with a portion corresponding to at least the portion in the first image 810. According to an embodiment, the electronic device 101 may obtain the image corresponding to at least the portion by synthesizing the second image 820 with at least a portion of the first image 810 corresponding to the view angle of the second image 820, synthesizing at least a portion of the second image with the image corresponding to at least the portion of the first image and producing the second synthesized image 840. Upon determining that at least a portion of the external object 811 in the obtained first image 810 matches the obtained second image 820, the electronic device 101 may synthesize the second image 820 with at least the portion of the first image 810, producing the second synthesized image 840. The resolution of the second synthesized image 840 may be the same as the resolution of the second image 820. The first synthesized image 650 may have the same point of view as the second synthesized image 840 since they adopt the same image transformation matrix except for different zoom ratios. Further, the electronic device 101 may perform a color tone matching process on the first image 610 or 810 and the second image 620 or 820, allowing them the same color tone.

According to an embodiment, in operation 1022, the electronic device 101 (e.g., the processor 120) may store the first synthesized image 650 and the second synthesized image 840 as part of images corresponding to the external object. The electronic device 101 may store the first synthesized image 650 produced in operation 1016 and the second synthesized image 840 produced in operation 1020 in the memory 130. The electronic device 101 may store the first synthesized image 650 produced in operation 1016 and the second synthesized image 840 produced in operation 1020 as part of the images corresponding to the external object.

Figure 11:
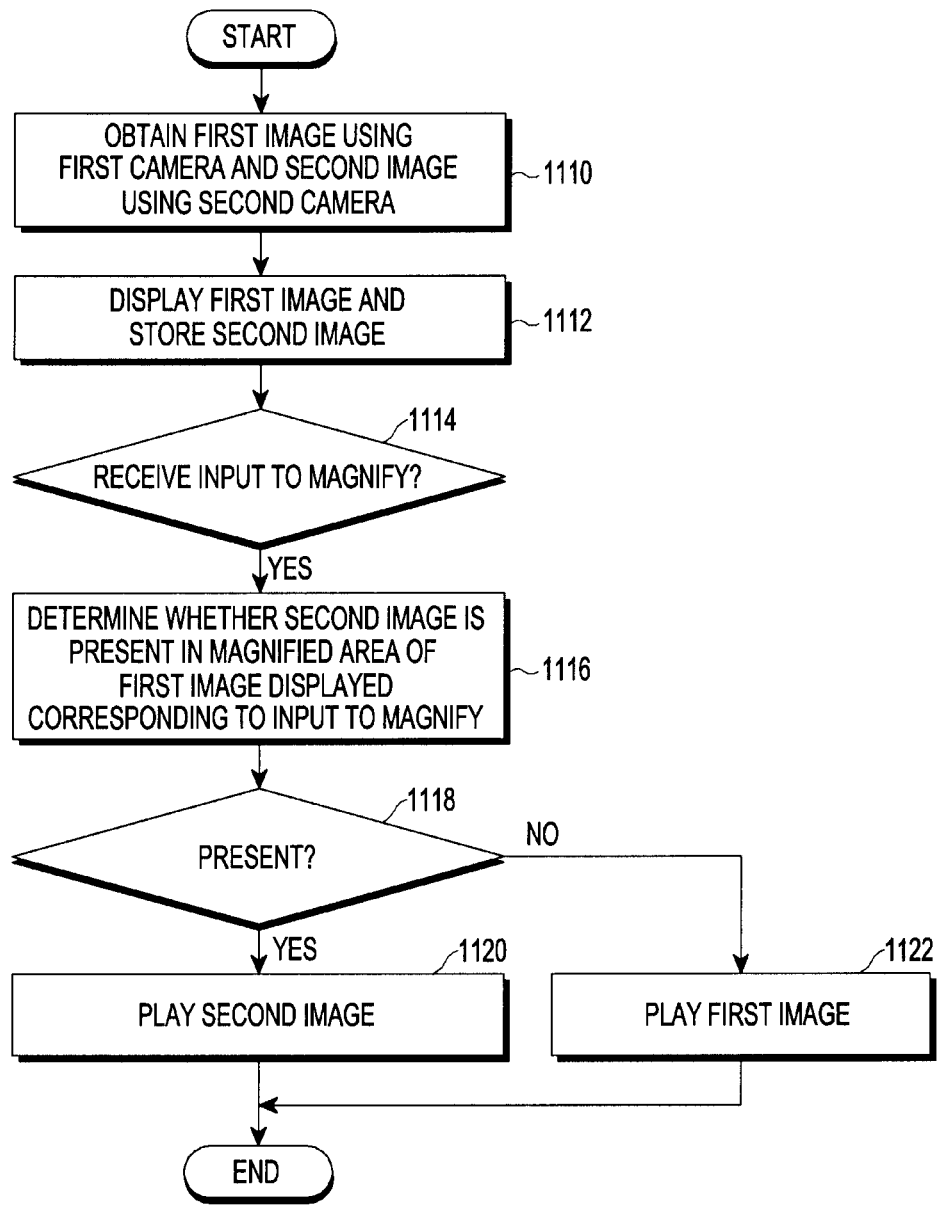
FIG. 11 is a flowchart illustrating the operation of magnifying and playing an image on an electronic device according to an embodiment.

FIG. 11 is a flowchart illustrating the operation of magnifying and playing an image on an electronic device according to an embodiment.

The operation of magnifying and playing images on an electronic device is described below in detail with reference to FIGS. 3, 4A-4D, and 11, according to an embodiment.

According to an embodiment, in operation 1110, the electronic device 101 (e.g., the processor 120) may obtain a first image 410 using the first camera 301 or 303 and a second image 420 using the second camera 302 or 304. The electronic device 101 may obtain the first image 410 corresponding to an external object 411 using the first camera 301 or 303 and the second image 420 corresponding to an external object 420 using the second camera 302 or 304. The electronic device 101 may obtain the first image 410 corresponding to the external object using the first camera 301 or 303 with a first view angle (e.g., a wide angle) and the second image 420 corresponding to the external object using the second camera 302 or 304 with a second view angle (e.g., a tele angle). The first image 410 and the second image 420 may simultaneously be obtained by one capturing input. For example, where the first image 410 has the first view angle, and the second image 420 has the second view angle smaller than the first view angle, the external object 411 in the first image 410 may be smaller in size than the external object 411 in the second image 420.

According to an embodiment, in operation 1112, the electronic device 101 (e.g., the processor 120) may display the first image 410 and store the second image 420. The electronic device 101 may decode the obtained first image and display the decoded first image at a default magnification on the display device 160. For example, the electronic device 101 may perform image processing, such as depth map generation, three-dimensional (3D) modeling, panorama generating, feature point extracting, image synthesizing or compensation (e.g., noise canceling, resolution adjusting, brightness adjusting, blurring, sharpening, or softening) on the image obtained through the first camera 301 or 303 and display the resultant image on the display device 160 at the default magnification. The electronic device 101 may display the obtained first image 410 on the display device 160 (e.g., a touchscreen display) based on a request to display the obtained first image 410 or an input to capture. The electronic device 101 may display at least one of the first image 410 or the second image 420 on the display device 160 (e.g., a touchscreen display) in response to the reception of the request to display at least one of the first image 410 with the first view angle through the first camera 301 or 303 or the second image 420 with the second view angle through the second camera 302 or 304. According to an embodiment, where the first image 410 is displayed based on the input to capture, the second image 420 may be stored in the memory 130. According to an embodiment, the electronic device 101 may decode the obtained second image and store in the memory 130. For example, the electronic device 101 may perform image processing, such as depth map generation, three-dimensional (3D) modeling, panorama generating, feature point extracting, image synthesizing or compensation (e.g., noise canceling, resolution adjusting, brightness adjusting, blurring, sharpening, or softening) on the image obtained through the second camera 302 or 304 and store the resultant image in the memory 130. According to an embodiment, where the second image 420 is displayed based on the input to capture, the first image 410 may be stored in the memory 130.

According to an embodiment, in operation 1114, the electronic device 101 (e.g., the processor 120) may detect the reception of an input to magnify. According to an embodiment, the electronic device 101 may receive an input to magnify the first image 410, with the first image 410 displayed on the display device 160. According to an embodiment, the electronic device 101 may receive an input to shrink the second image 420, with the second image 420 displayed on the display device 160. The input may be made by a multi-swipe gesture based on a touch on the display device 160 or adjustment (e.g., magnifying or shrinking) of the magnification through the functionality of the electronic device 101.

According to an embodiment, in operation 1116, the electronic device 101 (e.g., the processor 120) may determine whether the second image 420 is present in the magnified area of the third image 430 which is displayed corresponding to the input to magnify. According to an embodiment, the electronic device 101 (e.g., the processor 120) may determine whether the portion of the third image 430 which is displayed corresponding to the input to magnify is the same as the second image 420. According to an embodiment, the electronic device 101 may gradually magnify the first image 410 so that the first image 410 has the same size as the second image 420 according to the input to magnify and display on the display device 160. The electronic device 101 may determine whether the second image 420 is present in the portion of the third image 430 which is gradually magnified based on the input to magnify and displayed. The electronic device 101 may determine at least a portion of the third image 430 corresponding to the view angle of the second image 420 based on the input to magnify. The electronic device 101 may determine the area 420 where the second image 420 corresponds to the third image 430. According to an embodiment, the electronic device 101 may determine what portion of the third image 430 the second image 420 corresponds to based on property information (e.g., magnification, position of object, or color of object) about the second image 420. According to an embodiment, the electronic device 101 may determine the portion corresponding to the view angle of the second image 620 from the magnified first image, i.e., the third image 430. According to an embodiment, the electronic device 101 may gradually shrink and display the second image 420 according to an input to shrink the second image 420, with the second image 420 displayed. The electronic device 101 may determine whether the second image 420 is gradually magnified and displayed based on the input to shrink and the displayed second image 420 is present in the first image.

According to an embodiment, in operations 1118 and 1120, upon determining that the second image 420 has been synthesized in the portion 420 of the third image 430 displayed corresponding to the input to magnify, the electronic device 101 (e.g., the processor 120) may magnify and/or play the second image 420 synthesized in the portion 420 of the third image 430. According to an embodiment, the electronic device 101 may gradually magnify the first image 410 so that the magnification of the first image 410 is the same as the magnification of the second image 420, and upon determining that the portion of the third image 430, i.e., the magnified first image 410, matches the second image 420, the electronic device 101 may magnify and play (or display) the portion 420 of the third image 430 based on the input to magnify.

According to an embodiment, in operations 1118 and 1122, upon determining that the second image 420 is not present in the portion 420 of the third image 430 displayed corresponding to the input to magnify, the electronic device 101 (e.g., the processor 120) may magnify and play using the first image 410. Upon determining that the second image is not present in the portion 420 of the third image 430 which is gradually magnified to be equal in magnification to the second image 420 based on the input to magnify, the electronic device 101 may magnify and play (or display) the first image based on the input to magnify. According to an embodiment, upon determining that the second image 420 is not present in the portion 420 of the third image 430 displayed corresponding to the input to magnify, the electronic device 101 (e.g., the processor 120) may use the first image 410 in magnifying and displaying the rest except for the portion 420.

According to an embodiment, a method for controlling the display of images on an electronic device may comprise obtaining a first image corresponding to an external object using a first camera having a first view angle, obtaining a second image corresponding to the external object using a second camera having a second view angle, displaying the first image in response to an image display request corresponding to the external object, receiving a request to adjust a magnification of the displayed first image, when the magnification meets a designated first condition, displaying a first synthesized image in response to the request, the first synthesized image obtained by synthesizing at least a portion of the first image corresponding to a view angle of the second image with the second image resized to correspond to at least the portion of the first image, and when the magnification meets a designated second condition, displaying a second synthesized image obtained by synthesizing at least a portion of the second image with at least the portion of the first image.

According to an embodiment, the method may further comprise producing the first synthesized image by magnifying the first image and shrinking the second image to match at least a portion of the external object in the obtained first image with at least a portion of the external object in the obtained second image and producing the second synthesized image by magnifying the first image to match at least a portion of the external object in the obtained first image with at least a portion of the external object in the obtained second image.

FIGS. 12A, 12B, and 12C are views illustrating an example of displaying an image on an electronic device according to an embodiment.

Referring to FIG. 12A, according to an embodiment, a first image 1220 in a background 1210 is an image obtained by a first camera at a first view angle (e.g., a wide angle), and a second image 1230 is an image obtained by a second camera at a second view angle (e.g., a tele angle). The first view angle may be larger than the second view angle. Upon receiving an input to magnify the first image 1220, the electronic device 101 may magnify and display the first image 1220 based on a request to increase the magnification of the first image 1220. The electronic device 101 may determine whether the magnification of the first image 1220 meets a designated first condition while magnifying and displaying the first image 1220. According to an embodiment, the designated first condition may include the case where the magnification of the first image 1220 is smaller than the magnification of the second image 1230 based on the adjustment (e.g., increasing) of the magnification. According to an embodiment, the designated first condition may be determined to be met when the ratio of the area where the second image 1230 is displayed to the entire area of the display device 160 is not less than a predetermined value. Where the magnification of the first image 1220 which is magnified and displayed based on receiving the input to magnify meets the first condition, the electronic device 101 may display a first synthesized image obtained by synthesizing the second image 1230 with at least a portion of the first image 1220 corresponding to the view angle of the second image 1230.

Upon receiving an input to magnify the first synthesized image displayed, with the first synthesized image displayed, the electronic device 101 may further magnify and display the first synthesized image. The electronic device 101 may determine whether the magnification of the magnified first synthesized image 1220 meets a designated second condition. The electronic device 101 may determine whether the magnification meets the designated second condition while displaying the first synthesized image. According to an embodiment, the designated second condition may include the case where the first image displayed based on the adjustment (e.g., magnifying) of the magnification is not smaller in magnification than the second image. According to an embodiment, the electronic device 101 may determine that the designated second condition is met when the second image 420 is displayed on the entire area of the display device 160. Where the magnification of the first image 1220 which is magnified and displayed based on receiving the input to magnify meets the second condition, the electronic device 101 may display the second synthesized image according to the second image 1230.

Referring to FIG. 12B, when the magnification of the first image 1220 based on the input to magnify meets the designated first condition, the electronic device 101 may synthesize the first image 1220 and the second image 1230 and display the synthesized image, and when the second condition is met, the electronic device 101 may display the second image 1230, thereby producing and/or playing better quality of images as compared with the prior art shown in FIG. 12C.

As is apparent from the foregoing description, according to certain embodiments, the electronic device performs a mapping to match the color tone of a first image of a first view angle (e.g., a wide angle) with the color tone of a second image of a second view angle (e.g., a tele angle), addressing disparities in color tone between the first image and the second image. Such mapping may reduce color changes in image when switching the display from the first image to the second image. Since the first image and the second image have the same point of view, the electronic device 101 may mitigate disparities in, e.g., color, noise, or color tone, that the user may feel upon magnifying and/or switching images using an image of the first angle (e.g., a wide angle) and an image of the second angle (e.g., a tele angle). Thus, according to certain embodiments, the electronic device allows for the playback of a better quality of images while preventing the user from noticing the image change.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. An electronic device, comprising:
   a first camera having a first view angle;
   a second camera having a second view angle smaller than the first view angle;
   a display;
   at least one processor configured to:
      obtain a first image corresponding to an external object using the first camera and a second image corresponding to the external object using the second camera,
      control the display to display the first image,
      in response to a request to adjust a magnification of the displayed first image, when the magnification meets a designated first condition, control the display to display a first synthesized image wherein at least a portion of the first image is synthesized with the second image resized to correspond to the at least the portion of the first image, and when the magnification meets a designated second condition, control the display to display a second synthesized image wherein at least a portion of the second image is synthesized with at least the portion of the first image, resized to correspond to at least the portion of the second image; and
   a memory configured to store at least one of the obtained first image or the obtained second image, wherein the processor is configured to, upon receiving an input to magnify the first image, with the first image displayed on the display, identify whether the second image is present in the first synthesized image.

2. The electronic device of claim 1, wherein the at least one processor is configured to, synthesize at least the portion of the first image corresponding to a view angle of the second image with the second image resized to correspond to at least the portion of the first image.

3. The electronic device of claim 1, wherein the at least one processor is configured to produce the first synthesized image by magnifying the first image and shrinking the second image to match at least a portion of the external object in the obtained first image with at least a portion of the external object in the obtained second image.

4. The electronic device of claim 1, wherein the at least one processor is configured to produce the second synthesized image by magnifying the first image to match at least a portion of the external object in the obtained first image with at least a portion of the external object in the obtained second image.

5. The electronic device of claim 1, wherein the at least one processor is configured to magnify and control the display to display the displayed first synthesized image or the displayed second synthesized image to correspond to the magnification.

6. The electronic device of claim 1, wherein the designated first condition is that the first image displayed based on the adjustment of the magnification is smaller in magnification than the second image.

7. The electronic device of claim 1, wherein the designated second condition is that the first image displayed based on the adjustment of the magnification is larger in magnification than the second image.

8. The electronic device of claim 1, wherein the displayed first synthesized image is a synthesized image of at least the portion of the obtained first image and the obtained second image.

9. The electronic device of claim 1, wherein the displayed second synthesized image is the obtained second image.

10. The electronic device of claim 1, wherein the at least one processor is configured to control the display to display the second image based on the input to magnify when the second image is present in the first synthesized image.

11. The electronic device of claim 1, wherein the at least one processor is configured to control the display to display the first image based on the input to magnify unless the second image is present in the first synthesized image.

12. A non-transitory storage medium storing instructions configured to cause, when executed by at least one processor, the at least one processor to:
   obtain a first image corresponding to an external object using a first camera having a first view angle and a second image corresponding to the external object using a second camera having a second view angle smaller than the first view angle,
   identify at least a portion of the first image corresponding to a view angle of the second image,
   obtain a first synthesized image by synthesizing at least the portion of the first image with the second image resized to correspond to at least the portion of the first image,
   obtain a second synthesized image by synthesizing at least the portion of the first image with at least a portion of the second image, and
   store the first synthesized image and the second synthesized image as part of images corresponding to the external object,
   wherein the instructions further cause the at least one processor to:
   store at least one of the obtained first image or the obtained second image in a memory, and
   upon receiving an input to magnify the first image, with the first image displayed on a display, identify whether the second image is present in the first synthesized image.

13. The storage medium of claim 12, wherein the instructions further cause the at least one processor to:
   obtain the first synthesized image by magnifying the first image and shrinking the second image to match at least a portion of the external object in the obtained first image with at least a portion of the external object in the obtained second image.

14. The storage medium of claim 12, wherein the instructions further cause the at least one processor to:
   obtain the second synthesized image by magnifying the first image to match at least a portion of the external object in the obtained first image with at least a portion of the external object in the obtained second image.

15. The storage medium of claim 12, wherein the first synthesized image is a synthesized image of at least the portion of the obtained first image and the obtained second image.

16. The storage medium of claim 12, wherein the second synthesized image is the obtained second image.

17. The storage medium of claim 12, wherein the instructions further cause the at least one processor to:
upon receiving an input to magnify the first image, with the first image displayed on a display, identify whether the second image is present in a magnified area of the first image displayed corresponding to the input.

18. An electronic device, comprising:
a touchscreen display;
at least one processor configured to:
control the touchscreen display to display a first image corresponding to an external object and obtained using a first camera with a first view angle in response to an image display request corresponding to the external object, and
in response to a request to adjust a magnification of the displayed first image, when the magnification meets a designated first condition, control the touchscreen display to display, on the touchscreen display, a first synthesized image, wherein at least a portion of the first image is synthesized with a second image resized to correspond to at least the portion of the first image based on a view angle of the second image corresponding to the external object, the second image being obtained using a second camera with a second view angle smaller than the first view angle, and when the magnification meets a designated second condition, control the touchscreen display to display a second synthesized image wherein at least a portion of the second image is synthesized with at least the portion of the first image resized to correspond to the second image; and
a memory configured to store at least one of the obtained first image or the obtained second image, wherein the processor is configured to, upon receiving an input to magnify the first image, with the first image displayed on the display, identify whether the second image is present in the first synthesized image.

19. The electronic device of claim 18, wherein the at least one processor is configured to produce the first synthesized image by magnifying the first image and shrinking the second image to match at least a portion of the external object in the first image with at least a portion of the external object in the second image and produce the second synthesized image by magnifying the first image to match at least a portion of the external object in the first image with at least a portion of the external object in the second image.

* * * * *